United States Patent
Yang et al.

(10) Patent No.: US 8,606,987 B2
(45) Date of Patent: Dec. 10, 2013

(54) DATA WRITING METHOD FOR FLASH MEMORY AND CONTROLLER USING THE SAME

(75) Inventors: Jiunn-Yeong Yang, Keelung (TW); Jui-Hsien Chang, Taipei County (TW); Chien-Hua Chu, Hsinchu County (TW); Jian-Yo Su, Taipei County (TW); Chih-Kang Yeh, Kinmen County (TW)

(73) Assignee: Phison Electronics Corp., Miaoli (TW)

( * ) Notice: Subject to any disclaimer, the term of this patent is extended or adjusted under 35 U.S.C. 154(b) by 1091 days.

(21) Appl. No.: 12/052,348

(22) Filed: Mar. 20, 2008

(65) Prior Publication Data

US 2009/0150597 A1    Jun. 11, 2009

(30) Foreign Application Priority Data

Dec. 7, 2007    (TW) ................................ 96146922 A

(51) Int. Cl.
 *G06F 12/00*    (2006.01)
 *G06F 13/00*    (2006.01)
 *G06F 13/28*    (2006.01)

(52) U.S. Cl.
 USPC ........................................................ 711/103

(58) Field of Classification Search
 USPC ........................................................ 711/103
 See application file for complete search history.

(56) References Cited

U.S. PATENT DOCUMENTS

| 5,680,579 | A | * | 10/1997 | Young et al. | 711/157 |
| 5,953,737 | A | * | 9/1999 | Estakhri et al. | 711/103 |
| 7,574,565 | B2 | * | 8/2009 | De Souza | 711/135 |
| 2007/0083724 | A1 | * | 4/2007 | Kitamura | 711/163 |
| 2007/0245181 | A1 | * | 10/2007 | Suda | 714/718 |
| 2007/0268754 | A1 | * | 11/2007 | Lee et al. | 365/185.29 |
| 2007/0283081 | A1 | * | 12/2007 | Lasser | 711/103 |
| 2008/0183949 | A1 | * | 7/2008 | Ly et al. | 711/103 |

FOREIGN PATENT DOCUMENTS

| CN | 1567476 | 1/2005 |
| CN | 2676291 | 2/2005 |

* cited by examiner

*Primary Examiner* — Matthew Bradley
*Assistant Examiner* — Craig Goldschimdt
(74) *Attorney, Agent, or Firm* — J.C. Patents

(57) ABSTRACT

A data writing method for a flash memory is provided. The data writing method includes: dividing a new data into at lease one sub-data by the size of a writing unit; selecting one of a plurality of spare blocks from the flash memory as a substitute block for substituting a data block, wherein the new data is to be written into the data block; sequentially writing the sub-data having the size of the writing unit into the substitute block in the writing unit; and storing the sub-data not having the size of the writing unit into a temporary area. The writing efficiency of the flash memory can be improved by temporarily storing the sub-data not having the size of the writing unit into the temporary area and then writing the sub-data not having the size of the writing unit with subsequent data into the substitute block.

20 Claims, 13 Drawing Sheets

DATA WRITING METHOD FOR FLASH MEMORY AND CONTROLLER USING THE SAME

CROSS-REFERENCE TO RELATED APPLICATION

This application claims the priority benefit of Taiwan application serial no. 96146922, filed on Dec. 7, 2007. The entirety of the above-mentioned patent application is hereby incorporated by reference herein and made a part of this specification.

BACKGROUND

1. Technology Field

The present invention generally relates to a data writing method, in particular, to a data writing method for a flash memory and a controller using the same.

2. Description of Related Art

Along with the widespread of digital cameras, camera phones, and MP3 in recently years, the consumers' demand to storage media has increased drastically too. Flash memory is one of the most adaptable memories for such battery-powered portable products due to its characteristics such as data non-volatility, low power consumption, small volume, and non-mechanical structure. Besides being applied in foregoing portable products, flash memory is also broadly applied to external products such as flash cards and flash drives. Thereby, flash memory has become one of the most focused electronic products in recent years.

Flash memories can be categorized into single level cell (SLC) NAND flash memories and multi level cell (MLC) NAND flash memories according to the memory cells thereof. A flash memory is usually divided into a plurality of physical blocks, and for the convenience of description, these physical blocks will be referred as blocks thereinafter. Generally speaking, data in a flash memory is erased in unit of blocks, namely, each block contains the smallest number of memory cells which are erased together. Each block is usually divided into a plurality of pages. Page is usually the smallest programming unit, namely, page is the smallest unit for writing or reading data. However, it has to be noted that the smallest programming unit may also be a sector, namely, a page is further divided into a plurality of sectors and each sector is used as the smallest programming unit, in another flash memory design, such as a SLC NAND flash memory having the number of program (NOP) as 4.

FIGS. 1A~1E are detailed block diagrams illustrating a flash memory 100 and the operation thereof according to a conventional technique.

FIG. 1A illustrates the general structure and operation of a flash memory. Referring to FIG. 1A, in order to program (i.e. write and erase) a flash memory 100 efficiently, blocks in the flash memory 100 are logically grouped into system blocks 102, data blocks 104, and spare blocks 106.

The system blocks 102 are used for recording system data, wherein the system data may be the number of zones in the flash memory 100, the number of blocks in each zone, the number of pages in each block, and a logical-physical mapping table of the flash memory 100. Generally speaking, more than 90% of blocks in the flash memory 100 are the data blocks 104.

The data blocks 104 are used for storing user data and which are usually the blocks corresponding to the logical block addresses (LBAs) operated by a host (not shown).

The spare blocks 106 are used for substituting the data blocks 104. Accordingly, the spare blocks 106 are blank blocks, namely, no data is recorded in these blocks or data recorded in these blocks is marked as invalid data. To be specific, an erase operation has to be performed before data is written to a position which already contains data. As described above, data is written into a flash memory in unit of pages while erased from the same in unit of blocks. Since an erase unit is larger than a write unit, those valid pages in a block have to be copied to another block before data is erased from this block. Accordingly, to write a new data into a block M which already contains data among the data blocks 104, a block S is first selected from the spare blocks 106, and the valid data in the block M is copied to the block S together with the new data. After that, the block M is erased and linked as a spare block 106, and at the same time, the block S is linked as a data block 104 (as shown in FIG. 1A).

Generally speaking, blocks in the flash memory 100 are further logically grouped into substitute blocks 108 in order to use the flash memory 100 more efficiently.

FIG. 1B illustrates another operation of a flash memory, and FIG. 1C is a detailed diagram of the operation in FIG. 1B.

Referring to FIG. 1B and FIG. 1C, the substitute blocks 108 are used for substituting the data blocks 104. To be specific, when a block C is selected from the spare blocks 106 for substituting the block M among the data blocks 104, a new data is written into the block C but the valid data in the block M is not instantly copied into the block C to erase the block M. Instead, the valid data before the writing address in the block M (i.e., pages P0 and P1) is copied to the block C (as shown in (a) of FIG. 1C), and the new data (i.e., pages P2 and P3 in the block C) is written into the block C (as shown in (b) of FIG. 1C). Here the block C containing part of the old valid data and the new data is temporarily linked as a substitute block 108. This is because the valid data in the block M may become invalid in the next operation, so that instantly moving all the valid data in the block M to the block C may become meaningless. In the present example, the fact that multiple physical block addresses (PBAs) are mapped to one LBA is recorded, namely, the content of the block M and the content of the block C together is the content of a corresponding logical block. The blocks M and C are merged only when the contents thereof are actually to be combined, so that the usage efficiency of these blocks can be improved. For example, as shown in (c) of FIG. 1C, when foregoing two blocks are merged, the remaining valid data in the block M (i.e., pages P4~PN) is copied to the block C, then the block M is erased and linked as a spare block 106, and at the same time, the block C is linked as a data block 104.

In the example described above, the updated data when the two blocks are merged occupies exactly an entire page, and accordingly, the remaining valid data in the block M can be directly written into a page right after the updated data in the block C. However, the updated data may also occupy only part of a page. FIG. 1D illustrates another operation of the flash memory, and FIG. 1E is a detailed diagram of the operation in FIG. 1D.

In the example illustrated in FIG. 1D and FIG. 1E, the remaining valid data in the block M does not occupy an entire page (i.e., part of the old data and part of the new data occupy the same page, as page P3 in FIG. 1E). Thus, when the two blocks are merged, a blank block S is first selected from the spare blocks 106, and the valid data in the block M and the block C is copied into the block S. After that, the block M and the block C are erased and linked as spare blocks 106, and the block S is linked as a data block 104, so as to complete the merge operation. The reason for selecting the block S to merge the blocks M and C is that since each page can only be programmed once (the page P3 in the block C has been programmed), a blank block (for example, the block S in FIG. 1C) has to be selected for writing the data completely.

If a MLC NAND flash memory is used, each page in the MLC NAND flash memory includes four sectors, namely, each page has four sectors of 512 bytes, which is totally 2K bytes, wherein a sector is the smallest storage unit used in a file system. As described above, data is written into a flash memory in unit of pages. Accordingly, four sectors have to be programmed together in a MLC NAND flash memory. In other words, in foregoing example illustrated in FIG. 1E, even though the new data is not enough for an entire page (for example, the page P3 in the block C), the page P3 in the block C still has to be programmed entirely. However, if a next writing command is received before the blocks are merged and the writing command instructs that the data to be updated is right after the previously updated data (i.e., follows the update data in the page P3 of the block C), since the page P3 in the block C has been programmed in step (c) of FIG. 1E, a blank block has to be selected for copying the data in the pages P0~P2 of the block C again, and then the data in the page P3 of the block C is written together with the update data.

Due to the physical characteristics of a flash memory, a block has to be erased every time before a data is written into the block. However, the block may contain valid data originally. Thus, the valid data has to be moved (i.e., copied) before the block is erased. Foregoing operation for writing data of small quantity into the flash memory (as shown in FIG. 1E) may subsequently result in meaningless erasing and programming operations performed on the flash memory, and accordingly may reduce the efficiency of a storage device and the lifespan of the flash memory (i.e., only a limited number of erasing operations can be performed on the flash memory).

SUMMARY

Accordingly, the present invention is directed to a data writing method for a flash memory, wherein a plurality of continuous data which is less than a writing unit is written together so as to improve the writing efficiency of the flash memory.

The present invention is directed to a flash memory controller which executes a data writing method, wherein a plurality of continuous data which is less than a writing unit is written together so as to improve the writing efficiency of the flash memory.

The present invention provides a data writing method for a flash memory. The data writing method includes: a. dividing a new data into at least one sub-data by the size of a writing unit; b. selecting one of a plurality of spare blocks from the flash memory as a substitute block for substituting a data block, wherein the new data is to be written into the data block; c. sequentially writing the sub-data having the size of the writing unit into the substitute block in the writing unit; and d. storing the sub-data not having the size of the writing unit into a temporary area.

According to an embodiment of the present invention, the data writing method further includes writing a valid data in the data block into the substitute block in the writing unit.

According to an embodiment of the present invention, the data writing method further includes dividing the sub-data in the temporary area together with a subsequent new data into at least one sub-data by the size of the writing unit and executing step c when the subsequent new data follows the new data.

According to an embodiment of the present invention, the data writing method further includes writing the sub-data in the temporary area and the valid data in the data block into the substitute block in the writing unit when the subsequent new data does not follow the new data.

According to an embodiment of the present invention, when the flash memory is a multi level cell (MLC) NAND flash memory and each block in the MLC NAND flash memory includes an upper page and a lower page at which a writing speed is faster than that at the upper pages, the data writing method further includes only using the lower page of a block in the MLC NAND flash memory as the temporary area.

According to an embodiment of the present invention, the data writing method further includes establishing a page lookup table for recording the physical addresses of the lower pages.

According to an embodiment of the present invention, the writing unit includes at least one page.

According to an embodiment of the present invention, the data writing method further includes writing the data temporarily stored in the temporary area into the substitute block before a storage device having the flash memory is powered off.

According to an embodiment of the present invention, the data writing method further comprises storing the sub-data not having the size of the writing unit into the temporary area with a portion of a valid data in the data block.

The present invention provides a flash memory controller suitable for a storage device having at least one flash memory, wherein the flash memory includes a plurality of data blocks and a plurality of spare blocks. The flash memory controller includes a microprocessor unit, a flash memory interface, a buffer memory, and a memory management module. The flash memory interface is electrically connected to the microprocessor unit for accessing the flash memory. The buffer memory is electrically connected to the microprocessor unit for temporarily storing data. The memory management module is electrically connected to the microprocessor unit for executing a data writing steps, and the data writing steps include: a. dividing a new data into at least one sub-data by the size of a writing unit; b. selecting one of a plurality of spare blocks from the flash memory as a substitute block for substituting a data block, wherein the new data is to be written into the data block; c. sequentially writing the sub-data having the size of the writing unit into the substitute block in the writing unit; and d. storing the sub-data not having the size of the writing unit into a temporary area.

According to an embodiment of the present invention, the data writing steps further include writing a valid data in the data block into the substitute block in the writing unit.

According to an embodiment of the present invention, the data writing steps further include dividing the sub-data in the temporary area together with a subsequent new data into at least one sub-data by the size of the writing unit and executing step c when the subsequent new data follows the new data.

According to an embodiment of the present invention, the data writing steps further include writing the sub-data in the temporary area and the valid data in the data block into the substitute block in the writing unit when the subsequent new data does not follow the new data.

According to an embodiment of the present invention, the temporary area is a random access memory (RAM), a magnetoresistive RAM (MRAM), or a phase-change RAM (PRAM) disposed inside or outside the flash memory controller.

According to an embodiment of the present invention, the flash memory is a single level cell (SLC) NAND flash memory.

According to an embodiment of the present invention, the flash memory is a multi level cell (MLC) NAND flash memory, each block in the MLC NAND flash memory includes an upper page and a lower page at which a writing speed is faster than that at the upper pages, and the temporary area is the lower page of a block in the MLC NAND flash memory.

According to an embodiment of the present invention, the writing unit includes at least one page.

According to an embodiment of the present invention, the data writing steps further include writing the data temporarily stored in the temporary area into the substitute block before the storage device is powered off.

According to an embodiment of the present invention, the data writing steps further comprise storing the sub-data not having the size of the writing unit into the temporary area with a portion of a valid data in the data block.

The present invention provides a data writing method for a flash memory module, wherein the flash memory module includes a plurality of flash memories. The data writing method for the flash memory module includes: a. dividing a new data into at least one sub-data by the size of a writing unit; b. selecting one of a plurality of spare blocks from each of the flash memories as a substitute block for substituting a data block, wherein the new data is to be written into the data block; c. sequentially writing the sub-data having the size of the writing unit into the substitute block of each of the flash memories simultaneously in the writing unit; and d. storing the sub-data not having the size of the writing unit into a temporary area, wherein the writing unit includes a page in each of the flash memories in the flash memory module.

According to an embodiment of the present invention, when the flash memory is a MLC NAND flash memory and each block in the MLC NAND flash memory includes an upper page and a lower page at which a writing speed is faster than that at the upper pages, the data writing method further includes using only the lower page of a block in the MLC NAND flash memory as the temporary area.

The present invention provides a flash memory controller suitable for a storage device having a flash memory module, wherein the flash memory module includes a plurality of flash memories, and each of the flash memories includes a plurality of data blocks and a plurality of spare blocks. The flash memory controller includes a microprocessor unit, a flash memory interface, a buffer memory, and a memory management module. The microprocessor unit controls the operation of the entire flash memory controller. The flash memory interface is electrically connected to the microprocessor unit for accessing the flash memory module. The buffer memory is electrically connected to the microprocessor unit for temporarily storing data. The memory management module is electrically connected to the microprocessor unit for executing data writing steps, and the data writing steps include: a. dividing a new data into at least one sub-data by the size of a writing unit; b. selecting one of a plurality of spare blocks from each of the flash memories as a substitute block for substituting a data block, wherein the new data is to be written into the data block; c. sequentially writing the sub-data having the size of the writing unit into the substitute block of each of the flash memories simultaneously in the writing unit; and d. storing the sub-data not having the size of the writing unit into a temporary area, wherein the writing unit includes a page in each of the flash memories in the flash memory module.

According to an embodiment of the present invention, the temporary area is a RAM, a MRAM, or a PRAM disposed inside or outside the flash memory controller.

According to an embodiment of the present invention, when the flash memory is a MLC NAND flash memory and each block in the MLC NAND flash memory includes an upper page and a lower page at which a writing speed is faster than that at the upper pages, and the temporary area is the lower page of a block in the MLC NAND flash memory.

The present invention provides a data writing method for a SLC NAND flash memory. The data writing method includes: a. dividing a new data into at least one sub-data by the size of a writing unit; b. selecting one of a plurality of spare blocks from the SLC NAND flash memory as a substitute block for substituting a data block, wherein the new data is to be written into the data block; c. sequentially writing the sub-data having the size of the writing unit into the substitute block in the writing unit; and d. storing the sub-data not having the size of the writing unit into a temporary area, wherein each page in the SLC NAND flash memory can be programmed four times, and the capacity thereof is greater than 2K bytes.

In the data writing method for a flash memory and the controller executing the same provided by the present invention, data less than a writing unit is accumulated in a temporary area and then written together into a substitute block so that the writing efficiency of the flash memory can be improved.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1A:
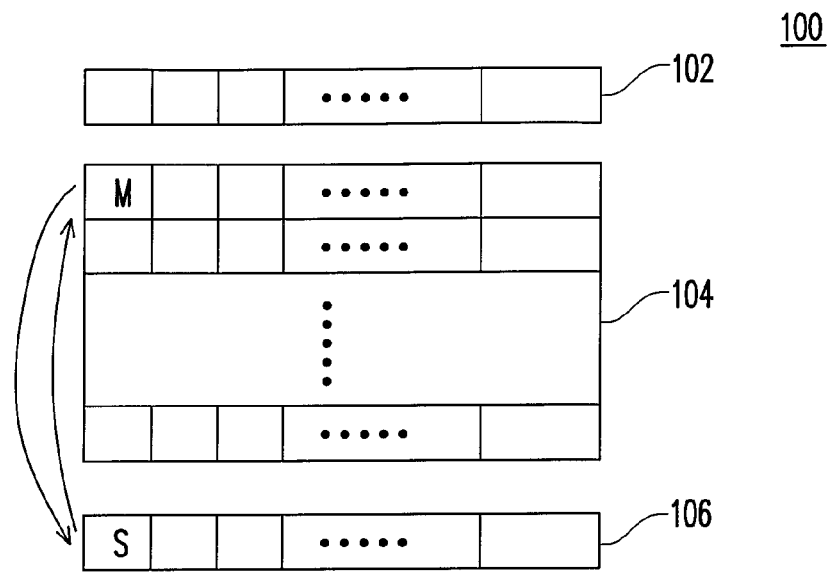
FIGS. 1A~1E are detailed block diagrams illustrating a flash memory and the operation thereof according to the conventional technique.

Reference will now be made in detail to the present preferred embodiments of the invention, examples of which are illustrated in the accompanying drawings. Wherever possible, the same reference numbers are used in the drawings and the description to refer to the same or like parts.

It should be understood that in embodiments of the present invention, terms like "select", "move", and "substitute" are only used for describing the operations performed on the blocks in a flash memory in a logical concept. In other words, the physical positions of the blocks in the flash memory are not changed; instead, the operations are logically performed on the hocks in the flash memory.

A flash memory storage system usually includes a flash memory and a controller (a control IC). A flash memory storage system is usually used along with a host system so that the host system can write data into or read data from the flash memory storage system. In addition, a flash memory storage system may also include an embedded flash memory and a software which is executed in the host system and served substantially as a controller of the embedded flash memory.

First Embodiment

Figure 2A:
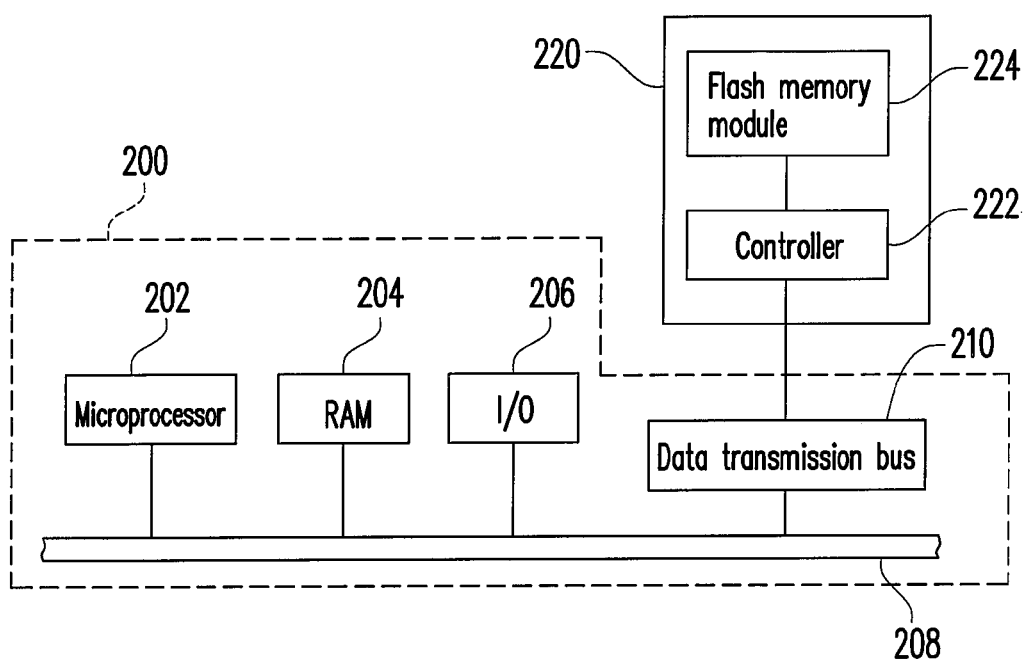
FIG. 2A illustrates a host having a flash memory storage device according to a first embodiment of the present invention.

FIG. 2A illustrates a host having a flash memory storage device according to the first embodiment of the present invention.

Referring to FIG. 2A, the host 200 includes a microprocessor 202, a random access memory (RAM) 204, an input/output (I/O) device 206, a system bus 208, and a data transmission bus 210. It should be understood that the host 200 may further include other components, such as a display device or a network device.

The host 200 may be a computer, a digital camera, a video camera, a communication device, an audio player, or a video player. Generally speaking, the host 200 can be substantially any system which can store data.

In the present embodiment, the flash memory storage device 220 is electrically connected to the other components of the host 200 through the data transmission bus 210. Data can be written into or read from the flash memory storage device 220 through the processing of the microprocessor 202, the RAM 204, and the I/O device 206. The flash memory storage device 220 includes a controller 222 and a flash memory module 224.

The controller 222 controls the operation of the flash memory storage device 220, such as data storing, reading, and erasing etc.

The flash memory module 224 is electrically connected to the controller 222 for storing data. In the present embodiment, the flash memory module 224 has a single multi level cell (MLC) NAND flash memory.

In the present embodiment, the flash memory storage device 220 is a USB flash disk. However, the present invention is not limited thereto. In another embodiment of the present invention, the flash memory storage device 220 may also be a memory card or a solid state drive (SSD).

Figure 2B:
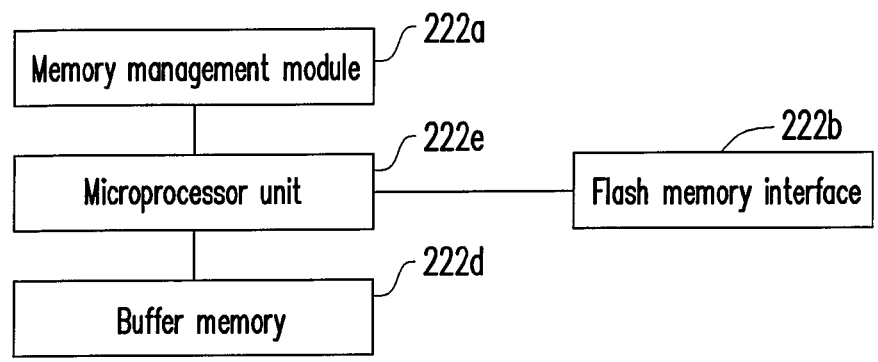
FIG. 2B is a detailed block diagram of a flash memory controller in FIG. 2A.

FIG. 2B is a detailed block diagram of the flash memory controller in FIG. 2A.

The controller 222 includes a memory management module 222a, a flash memory interface 222b, a buffer memory 222d, and a microprocessor unit 222e.

The memory management module 222a is electrically connected to the microprocessor unit 222e for managing the flash memory module 224, such as for executing a wear leveling method, managing bad blocks, and maintaining a mapping table etc. In particular, the memory management module 222a executes data writing steps according to an embodiment of the present invention (which will be described below with reference to FIGS. 3A and 3B).

The flash memory interface 222b is electrically connected to the microprocessor unit 222e for accessing the flash memory module 224. Namely, data to be written into the flash memory module 224 by the host 200 is converted into a format acceptable to the flash memory module 224 by the flash memory interface 222b.

The buffer memory 222d is electrically connected to the microprocessor unit 222e for temporarily storing system data (for example, a mapping table) or data to be read or written by the host. In the present embodiment, the buffer memory 222d is a static RAM (SRAM). However, the present invention is not limited thereto, and the buffer memory 222d may also be a dynamic RAM (DRAM), a magnetoresistive RAM (MRAM), a phase-change RAM (PCRAM), or other suitable memories.

The microprocessor unit 222e controls operations of all components in the controller 222.

Figure 2C:
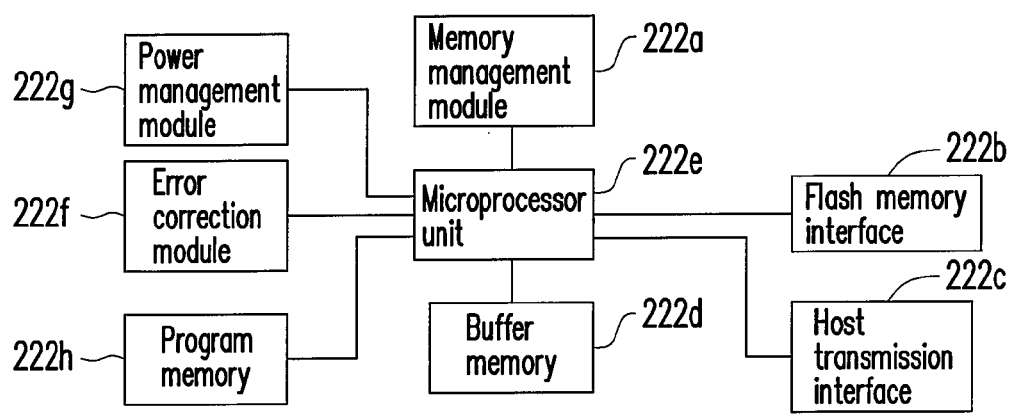
FIG. 2C is a detailed block diagram of a flash memory controller according to another embodiment of the present invention.

In another embodiment of the present invention, the controller (for example, the controller 222' illustrated in FIG. 2C) further includes a host transmission interface 222c, a program memory 222h, an error correction module 222f, and a power management module 222g.

The host transmission interface 222c is electrically connected to the microprocessor unit 222e for communicating with the host 200. The host transmission interface 222c may be a USB interface, an IEEE 1394 interface, a SATA interface, a PCI Express interface, a MS interface, a MMC interface, a SD interface, a CF interface, or an IDE interface.

The program memory 222h is electrically connected to the microprocessor unit 222e for storing a program code, wherein the program code is executed by the controller for controlling the flash memory storage device 220.

The error correction module 222f is electrically connected to the microprocessor unit 222e for calculating an error correcting code (ECC code), wherein the ECC code is used for checking and correcting the data to be read or written by the host.

The power management module 222g is electrically connected to the microprocessor unit 222e for managing the power supply of the flash memory storage device 220.

Figure 3A:
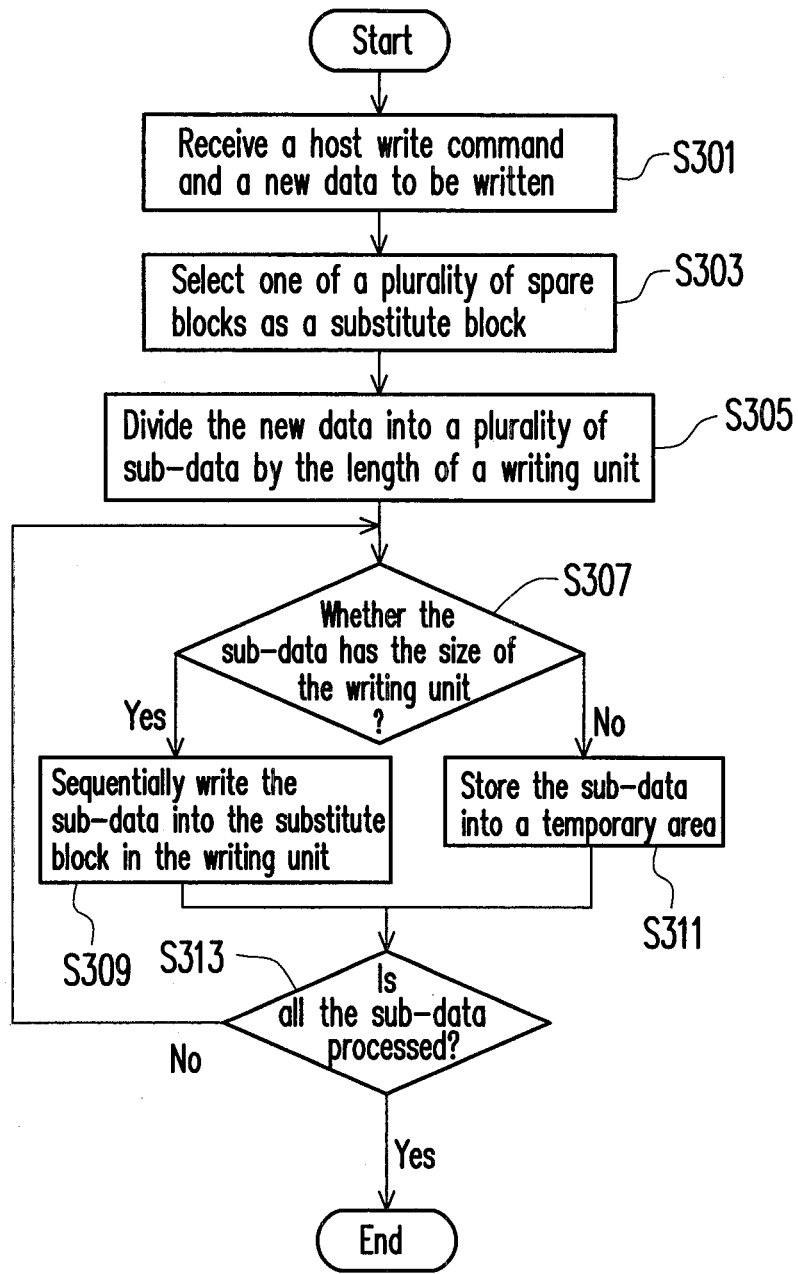
FIGS. 3A and 3B are flowcharts illustrating a data writing method for a flash memory according to the first embodiment of the present invention.
Figure 3B:
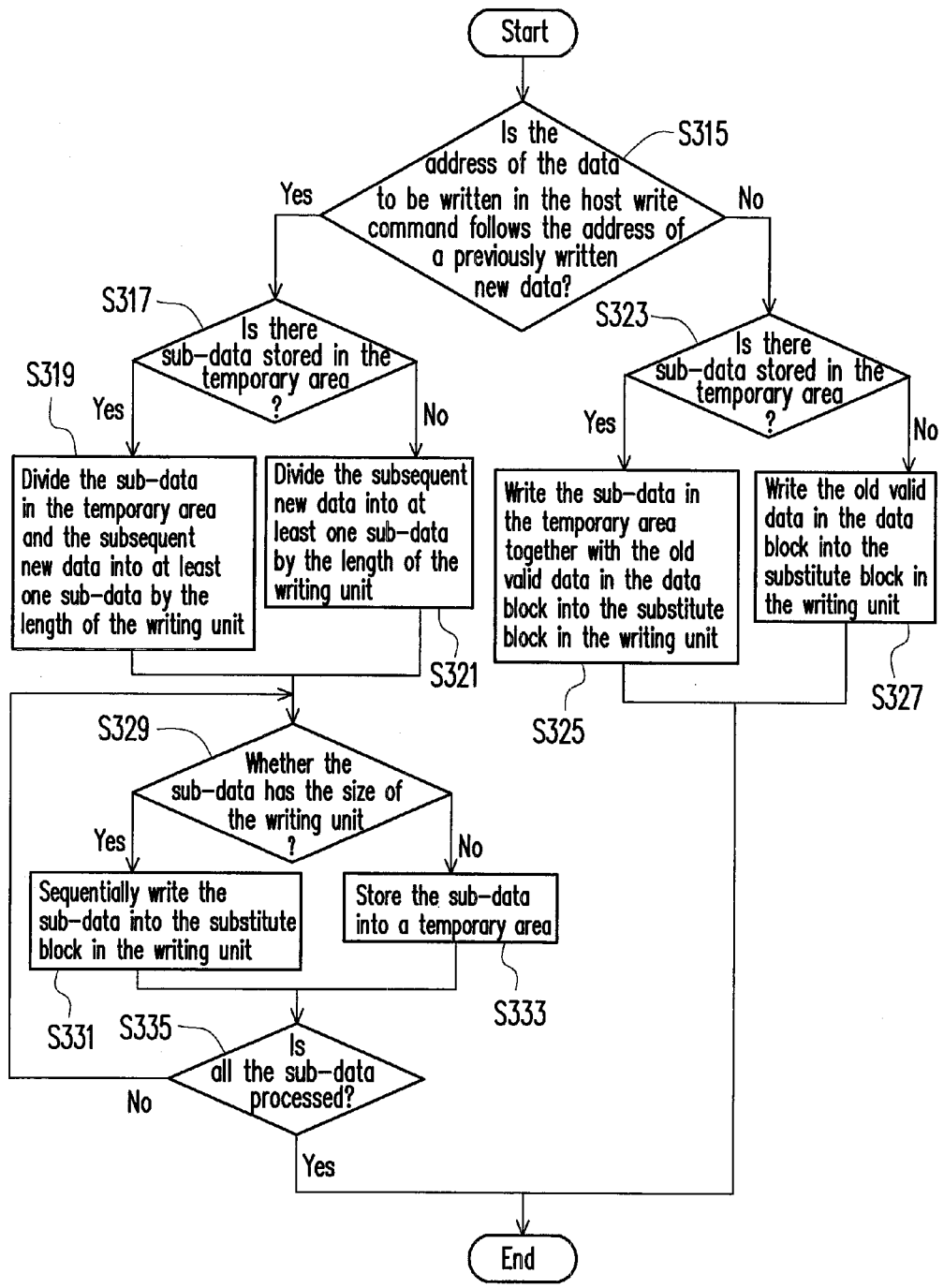
Figure 4:
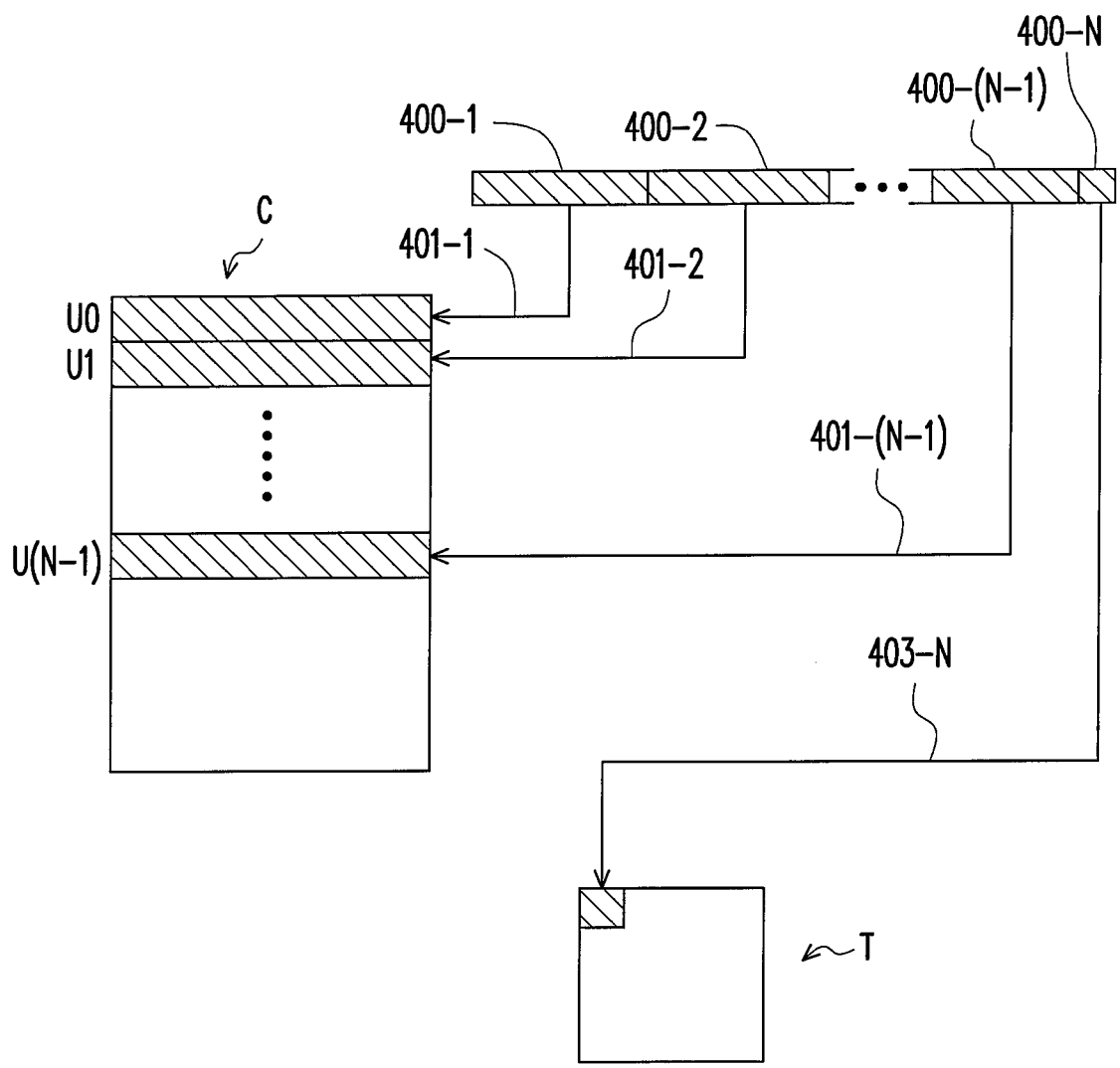
FIG. 4 is a diagram illustrating a data writing operation according to the first embodiment of the present invention.

FIGS. 3A and 3B are flowcharts illustrating a data writing method for a flash memory according to the first embodiment of the present invention, and FIG. 4 is a diagram illustrating a data writing operation according to the first embodiment of the present invention. The data writing method for a flash memory in the present embodiment will be described in detail with reference to FIG. 3A, FIG. 3C, and FIG. 4.

Referring to FIG. 3A, in step S301, the controller 222 receives a host write command and a new data to be written from the host 200. To be specific, the microprocessor unit 222e in the controller 222 receives the host write command and controls the memory management module 222a, the flash memory interface 222b, and the buffer memory 222d to execute the host write command. After that, in step S303, one of a plurality of spare blocks is selected as a substitute block C (as shown in FIG. 4).

The process of selecting a blank block (i.e. the substitute block C) for substituting a data block while writing data into the flash memory has been described above with reference to FIG. 1A~1E therefore will not be described herein.

In step S305, the new data is divided into a plurality of sub-data (for example, the sub-data 400-1, 400-2 . . . 400-(N−1), and 400-N in FIG. 4) by the size of a writing unit. However, it should be understood that the new data itself is the only sub-data when the new data is shorter than the writing unit. In the present embodiment, the controller 222 always programs a data of a fixed writing unit size when the controller 222 executes the write command on the flash memory, and each write command is executed for a fixed writing unit time. In the present invention, the writing unit varies along with the structure of the flash memory. In the present embodiment, the flash memory module 224 in the flash memory storage device 220 has a single MLC NAND flash memory, and the writing unit thereof is designed to be one page having four sectors. It should be mentioned that even a MLC NAND flash memory is described as an example in the present embodiment, the present invention is not limited thereto, and the flash memory module 224 may also be a single level cell (SLC) NAND flash memory.

In step S307, whether each of the sub-data has the size of the writing unit is sequentially determined. Logically, it is only to determine whether the last sub-data (for example, the sub-data 400-N) has the size of the writing unit since the new data is orderly divided by the fixed size of the writing unit. Thus, in another embodiment of the present invention, only whether the last sub-data has the size of the writing unit is determined.

If it is determined that a sub-data has the size of the writing unit in step S307, the sub-data is sequentially written into the substitute block in the writing unit (for example, the writing operations 401-1, 401-2 . . . and 401-(N−1) in FIG. 4), as in step S309.

If it is determined that the sub-data does not have the size of the writing unit in step S307, the sub-data is stored into a temporary area, as in step S311. In other words, in step S311, the sub-data which is not enough for a writing unit (i.e. a small quantity data) is not written into the substitute block C; instead, the small quantity data is temporarily stored (for example, the storing operation 403-N in FIG. 4) in a temporary area T. In the present embodiment, the temporary area T is the lower page of a temporary block in the flash memory module 224, wherein the temporary block is an unused block in the flash memory module 224. For example, the temporary block is selected from the spare blocks, and the lower page is a page having faster writing speed in a block of the flash memory and which is also referred as a fast page.

In the present embodiment, the flash memory module 224 is a MLC NAND flash memory, and each block in the MLC NAND flash memory is programmed in multiple phases. For example, taking a 4-level cell NAND flash memory as an example, each block therein is programmed in two phases. During the first phase, the lower page of the block is written, and the physical characteristic thereof is similar to that of a SLC NAND flash memory. The upper page of the block is programmed after the first phase is completed. During the programming process, the writing speed of the lower page is faster than that of the upper page. In particular, there is a coupling relationship between the upper page and the lower page. Namely, instability of the lower page (i.e. data may be lost) may be caused if an error occurs while programming the upper page. This is why the reliability of a MLC NAND flash memory is lower than that of a SLC NAND flash memory. Similarly, in an 8-level or 16-level cell NAND flash memory, a memory cell includes more pages and accordingly each block therein is programmed in more phases. Here a page having the fastest writing speed is referred as a lower page, and all the other pages having slower writing speeds are referred as an upper page. For example, an upper page includes a plurality of pages having different writing speeds. In the present embodiment, the writing speed and reliability of the flash memory can be improved by using only the lower page of a block as foregoing temporary area T.

In another embodiment of the present invention, the data writing method further includes establishing a page lookup table for recording the physical addresses of lower pages in the flash memory.

Even though the lower page of a temporary block (i.e. an unused block) in the flash memory module 224 is used as the temporary area T in the present embodiment, the present invention is not limited thereto, and any other suitable storage medium may also be used as the temporary area. For example, in another embodiment of the present invention, a random access memory (RAM), in particular, a dynamic RAM (DRAM), is further disposed inside or outside the controller 222 in the flash memory storage device 220 to serve as the temporary area T. The advantage of using a DRAM as the temporary area is that the number of write/erase operations performed to the flash memory can be reduced and the lifespan thereof can be prolonged. Besides, because the access speed of a DRAM is faster than that of a flash memory, the execution performance of the storage device can be improved.

In yet another embodiment of the present invention, a magnetoresistive RAM (MRAM) or a phase-change RAM (PRAM) is further disposed inside or outside the controller 222 in the flash memory storage device 220 to serve as the temporary area T. The advantages of using a MRAM as the temporary area include low power consumption, non-volatility, and semi-permanency. Besides, the number of write/erase operations performed to the flash memory can be reduced and the lifespan thereof can be prolonged.

Thereafter, in step S313, whether all the sub-data has been processed is determined. If it is determined that there is still sub-data to be processed in step S313, step S307 is executed until all the sub-data has been processed.

Figure 5:
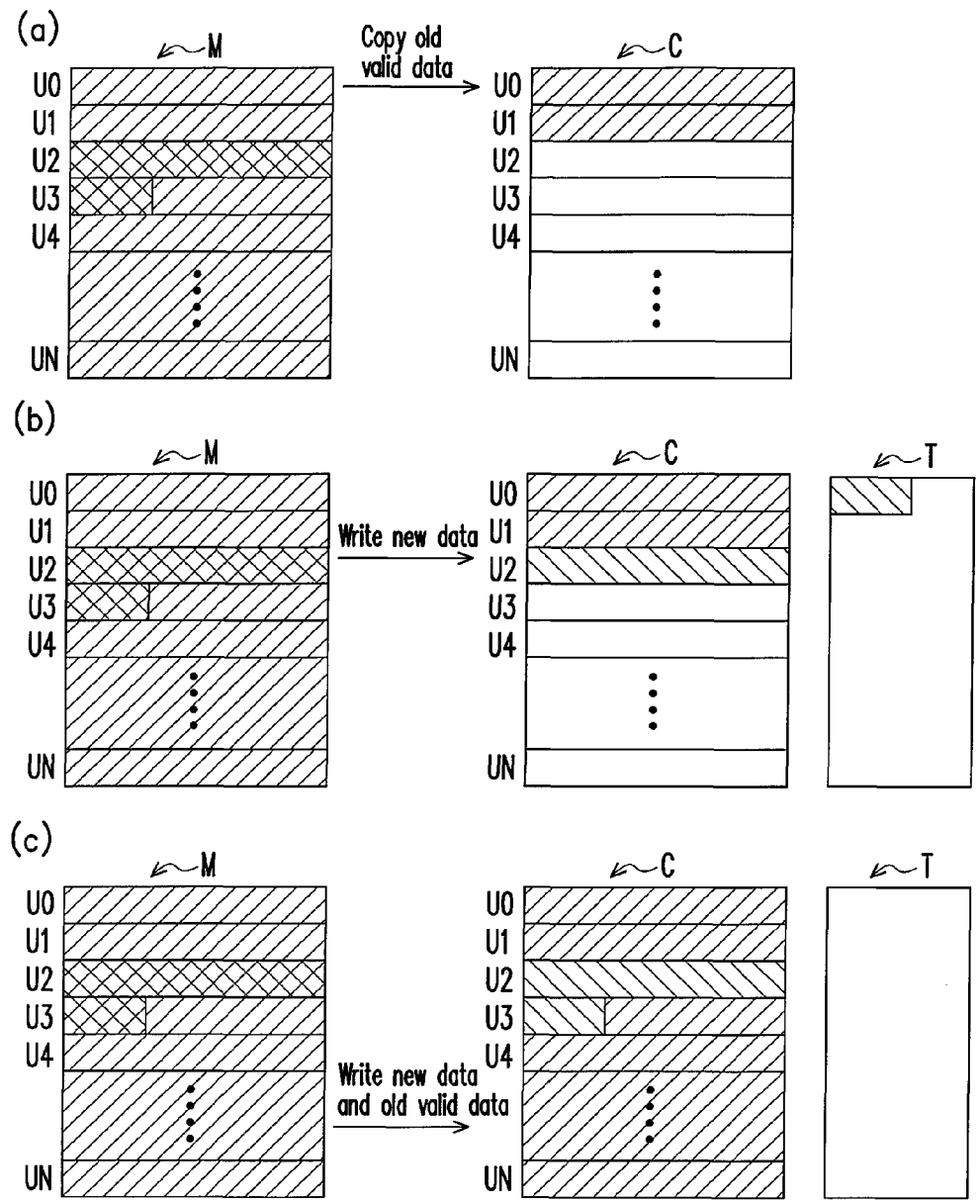
FIG. 5 is a diagram illustrating a data writing operation according to another embodiment of the present invention.

In another embodiment of the present invention, the data writing method further includes copying an old valid data in the data block before the address for writing the new data to the substitute block before writing the new data into the substitute block (as shown in FIG. 5 (a)).

In the present embodiment, the controller 222 temporarily finishes executing the writing command after step S313. In another embodiment of the present invention, if the operation of the flash memory storage device 220 is to be stopped in foregoing temporary state, the sub-data in the temporary area T is written together with the old valid data in the data block into the substitute block in the writing unit (as shown in FIG. 5(c)). After that, the data block is erased as a spare block, and the substitute block is linked as a data block (the same as the integration illustrated in FIG. 1B).

Figure 6:
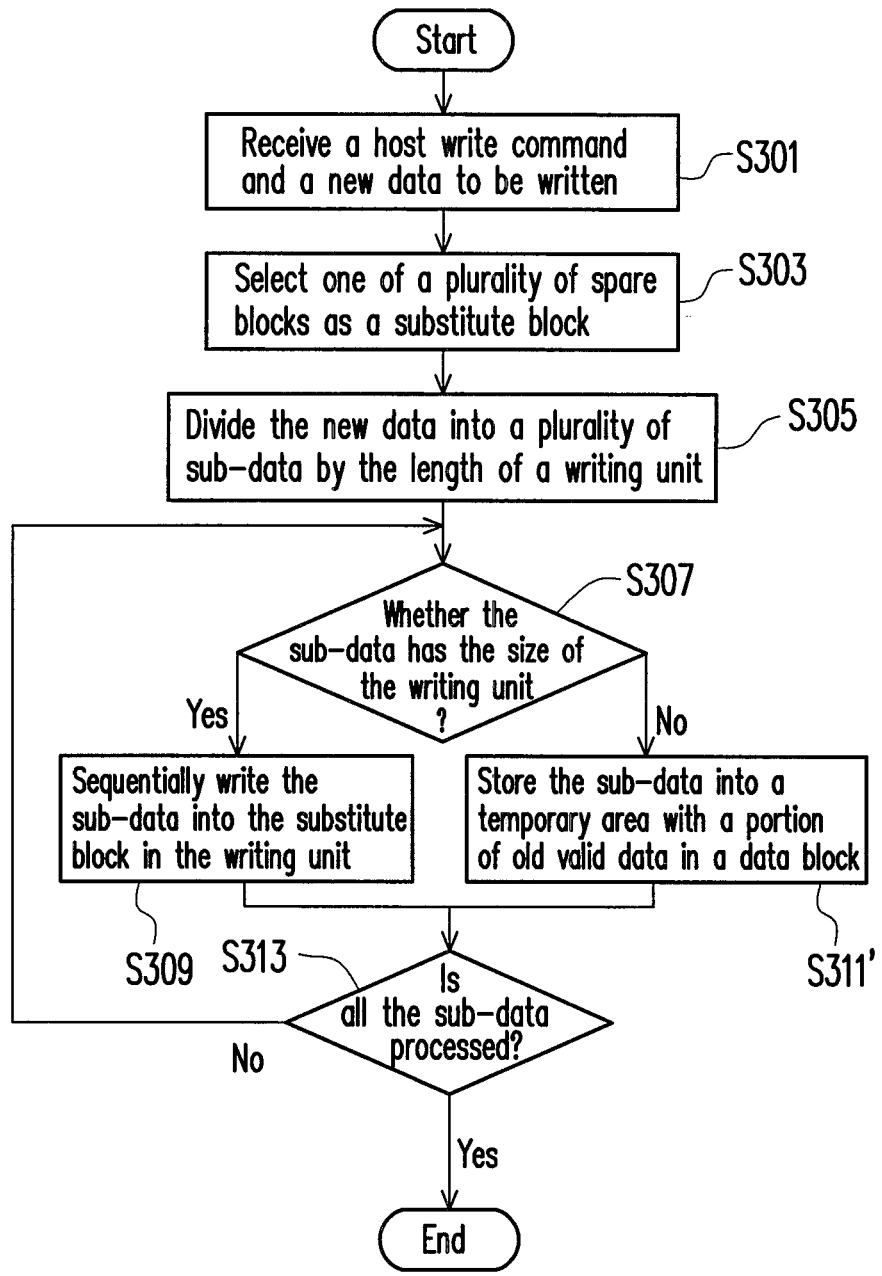
FIG. 6 is a flowchart illustrating a data writing method for a flash memory according to another embodiment of the present invention.
Figure 7:
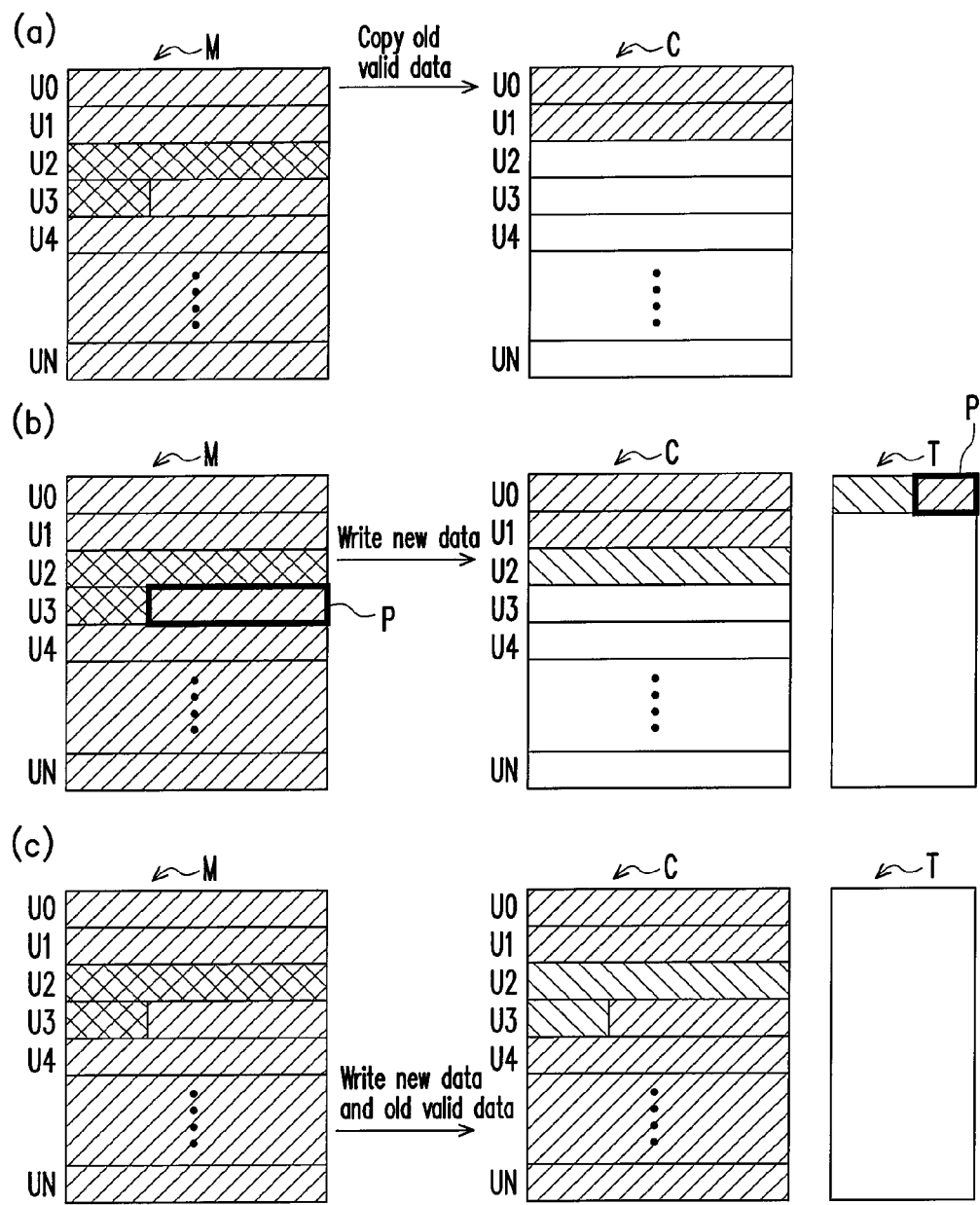
FIG. 7 is a diagram illustrating a data writing operation according to another embodiment of the present invention.

Additionally, because the sub-data in the temporary area T must be written together with the old valid data in the data block into the substitute block to be integrated in final, in another embodiment of the present invention, the sub-data not having the size of the writing unit may be stored into a temporary area with a portion of old valid data P in the data block (S 311' shown in FIG. 6), such that the whole of the sub-data may not having the size of the writing unit and the portion of old valid data P have the size of the writing unit (as shown in FIG. 7(b)). Thus, it is convenient to move data stored the temporary area T to the substitute block in the writing unit.

FIG. 3B illustrates the processing flow when a host write command is received in the temporary state as shown in FIG. 3A. In step S315, whether the address of a subsequent new data in the host write command follows the address of the previously written new data is determined.

If it is determined in step S315 that the address of the subsequent new data follows the address of the previously written new data, whether there is sub-data temporarily stored in the temporary area is determined in step S317.

If it is determined in step S317 that there is sub-data temporarily stored in the temporary area, then in step S319, the sub-data in the temporary area together with the subsequent new data is divided into at least one sub-data by the size of the writing unit (similar to step S305).

If it is determined in step S317 that there is no sub-data stored in the temporary area, then in step S321, the subsequent new data is divided into at least one sub-data by the size of the writing unit (similar to step S305). Steps S329, S331, S333, and S335, which are respectively the same as steps S307, S309, S311, and S313 in FIG. 3A, are executed after steps S319 and S321.

In step S329, whether the sub-data has the size of the writing unit is sequentially determined. If it is determined in step S329 that a sub-data has the size of the writing unit, the sub-data is sequentially written into the substitute block in the writing unit in step S331. Otherwise, the sub-data is stored into a temporary area in step S333. After that, in step S335, whether all the sub-data has been processed is determined. If there is still sub-data to be processed, step S329 is executed until all the sub-data has been processed.

If it is determined in step S315 that the address of the subsequent new data does not follow the address of the previously written new data, whether there is sub-data stored in the temporary area is determined in step S323.

If it is determined in step S323 that there is sub-data stored in the temporary area, then in step S325, the sub-data in the temporary area is written together with the old valid data in the data block into the substitute block in the writing unit (as shown in FIG. 5(c)). Additionally, in the case where the sub-data not having the size of the writing unit is stored into a temporary area with a portion of old valid data P in the data block, in step S325 the sub-data may not having the size of the writing unit and the portion of old valid data P are moved from the temporary area T to the substitute block in the writing unit (as shown in FIG. 7(c)).

Figure 1B:
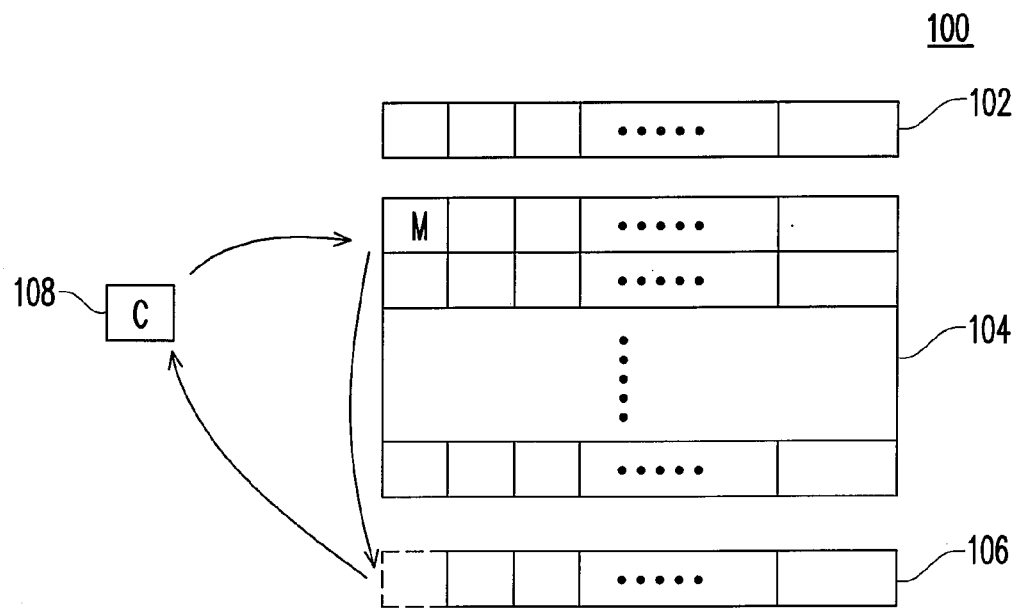
Figure 1C:
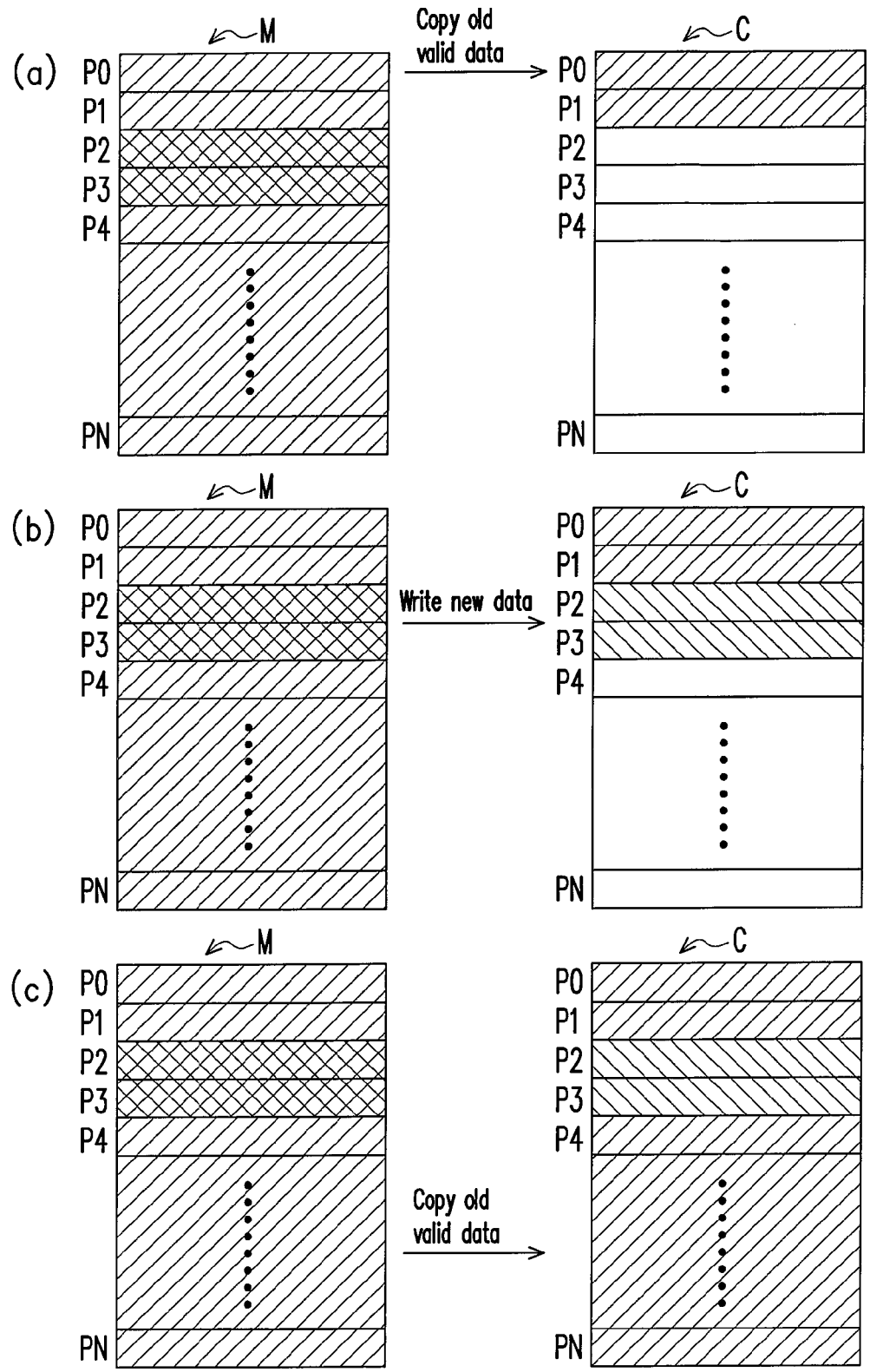
Figure 1D:
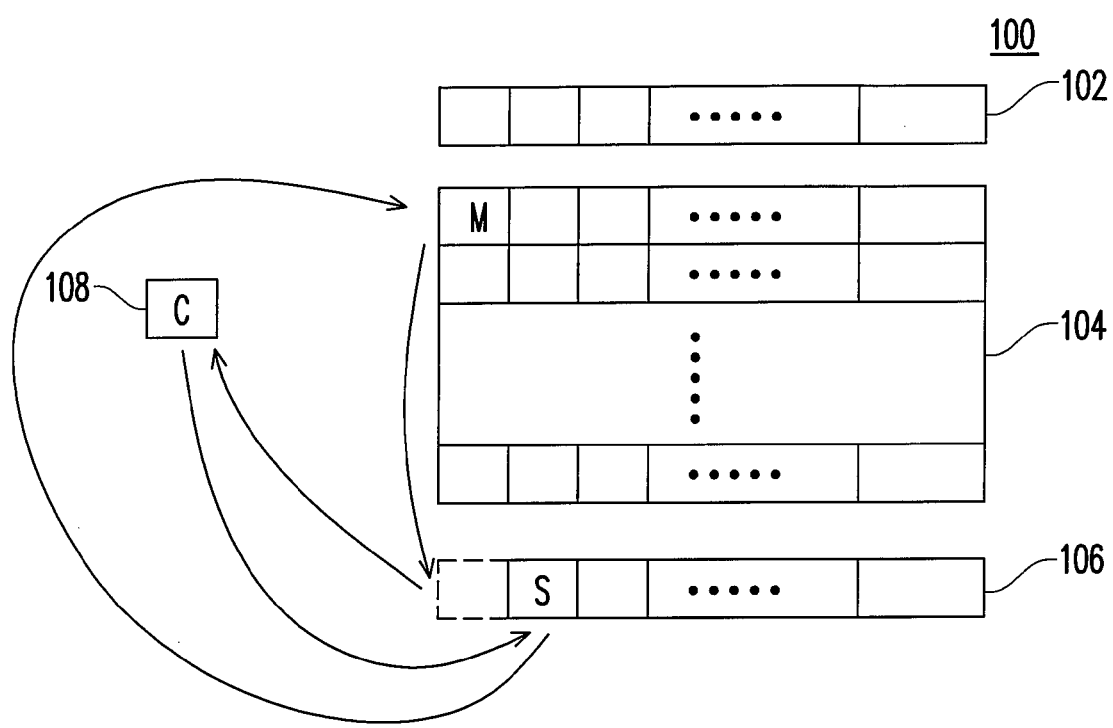
Figure 1E:
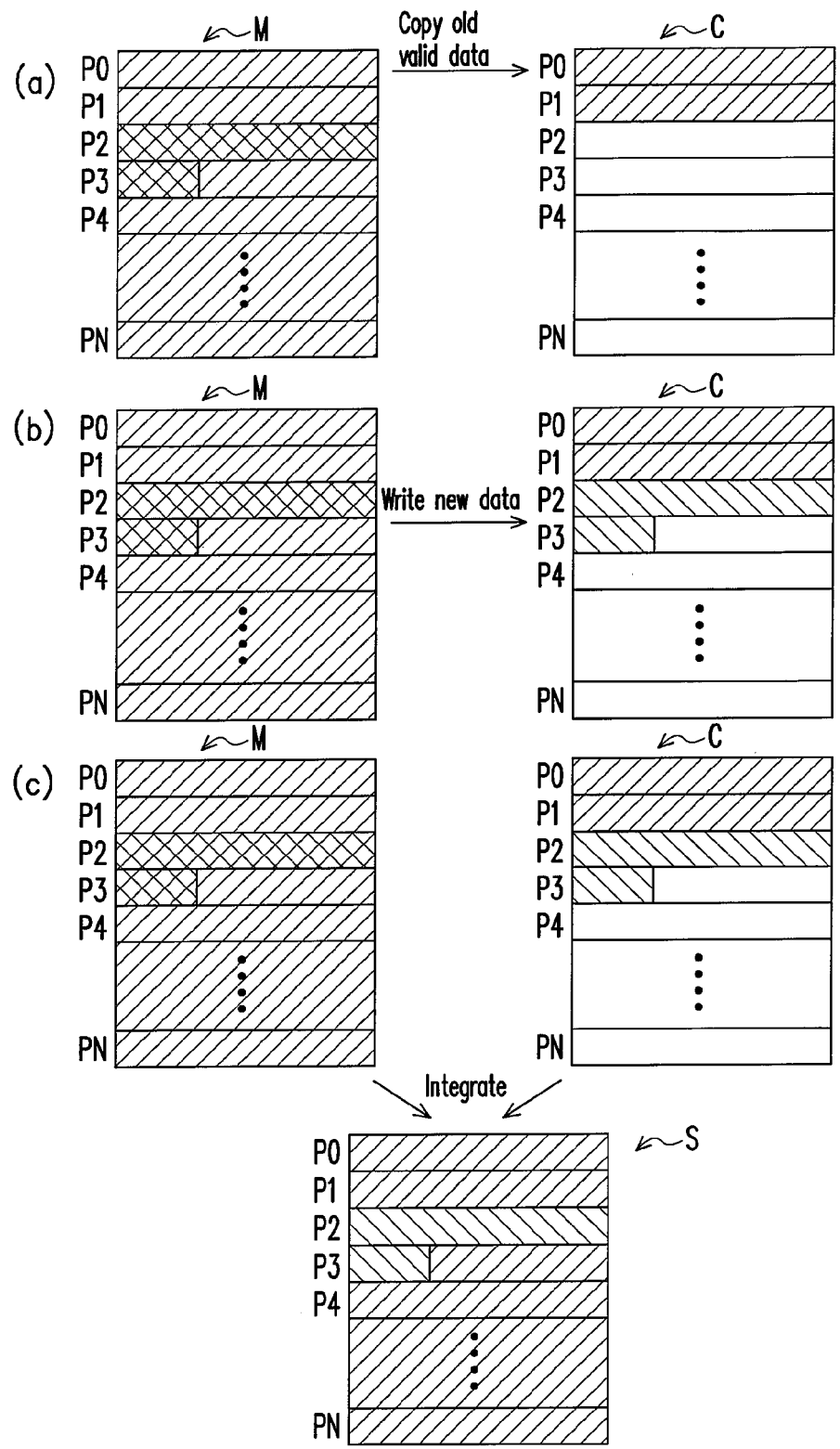

If it is determined in step S323 that there is no sub-data in the temporary area, then in step S327, the old valid data in the data block is written into the substitute block in the writing unit. After that, the memory management module 222a in the controller 222 erases the data block as a spare block and links the substitute block as a data block (as shown in FIG. 1B).

It should be mentioned that if the block in the flash memory corresponding to a logical block is in the state as shown in FIG. 3A or FIG. 6, whether a data to be written follows the currently updated data in the block is determined when the controller 222 executes the host write command, as the steps in FIG. 3B.

In another embodiment of the present invention, if the temporary area is implemented with a volatile memory (for example, a DRAM), the data writing method for the flash memory further includes writing the data temporarily stored in the temporary area into the substitute block before the flash memory storage device is powered off.

In the present embodiment, a set of mother-child blocks (i.e. a data block and a substitute block) is described as an example. However, the present invention is not limited thereto. During the operation of the flash memory storage device 220, the controller 222 can record multiple sets of mother-son blocks by using the available storage space in the buffer memory 222d so as to use the blocks in the flash memory more efficiently. To be specific, if the buffer memory 222d can be used for storing multiple sets of mother-child blocks, when it is determined in foregoing step S315 that the address of the data to be written in the host write command does not follow the address of the previously written data (i.e. the updated data in the mother-son blocks in the buffer memory 222d), only one set of the mother-child blocks is integrated, and when next time the system writes data into the flash memory, the data may be written into any set of mother-child blocks currently recorded in the buffer memory 222d, so that the efficiency in using the blocks in the flash memory can be improved.

Second Embodiment

In the first embodiment, the flash memory storage device having a single MLC NAND flash memory is described as an example, and accordingly, the writing unit thereof is designed to be a page. In the second embodiment of the present invention, a flash memory storage device having a flash memory module composed of two SLC NAND flash memories will be described as an example.

The flash memory storage device and the operation and data writing method for the flash memory in the present embodiment are the same as those in the first embodiment therefore will not be described herein. Only the differences between the two embodiments will be described below.

Figure 8:
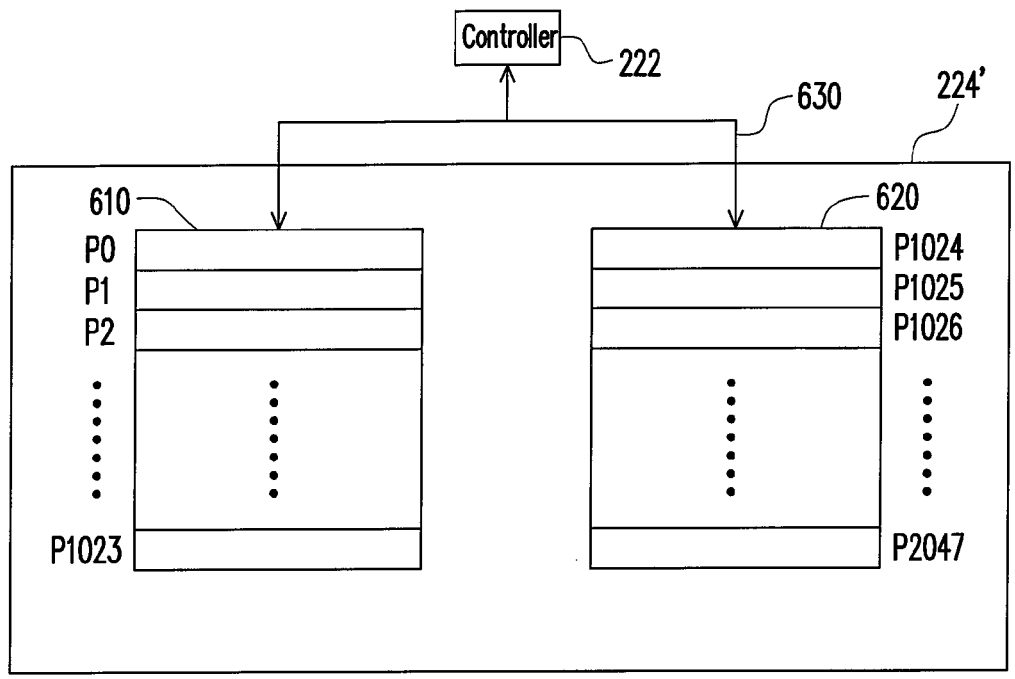
FIG. 8 is a detailed block diagram of a flash memory module according to a second embodiment of the present invention.

FIG. 8 is a detailed block diagram of a flash memory module according to the second embodiment of the present invention.

Referring to FIG. 8, the flash memory module 224' includes a first flash memory 610, a second flash memory 620, and a data bus 630. The first flash memory 610 has pages P0~P1023, and the second flash memory 620 has pages P1024~P2047. The first flash memory 610 and the second flash memory 620 are electrically connected to the data bus 630 in an interleaving way, and the data bus 630 is connected to the controller 222.

With the structure described above, when data is written into the flash memory module 600, the first flash memory 610 and the second flash memory 620 are programmed simultaneously. For example, the page 0 in the first flash memory 610 and the page 1024 in the second flash memory 620 are programmed simultaneously. Thereby, in the second embodiment, the data writing method described above is executed with two pages as on writing unit.

There is already existing technique for programming a page for four times (i.e. the number of program (NOP) is 4) when SLC NAND flash memories are adopted, which means exactly four sectors are programmed every time when a page has 2K bytes, so that foregoing problem will not happen. However, the storage capacity of each block is increased (for example, a page has 4K bytes) along with the development of semiconductor technology. For example, every time 1K bytes have to be programmed when a SLC NAND flash memory having NOP=4 is adopted. Accordingly, the efficiency in writing small quantity data (data less than a writing unit) into the SLC NAND flash memory can be improved and the lifespan of the SLC NAND flash memory can be prolonged through the method described in the present invention.

Third Embodiment

In the second embodiment, a flash memory module composed of two SLC NAND flash memories is described as an example. However, the present invention may also be applied to a flash memory module composed of more flash memories. In the third embodiment of the present invention, a flash memory module having four SLC NAND flash memories will be described as an example.

The flash memory storage device and the operation and data writing method for the flash memory in the present embodiment are the same as those in the second embodiment therefore will not be described herein. Only the differences between the third embodiment and the second embodiment will be described below.

Figure 9:
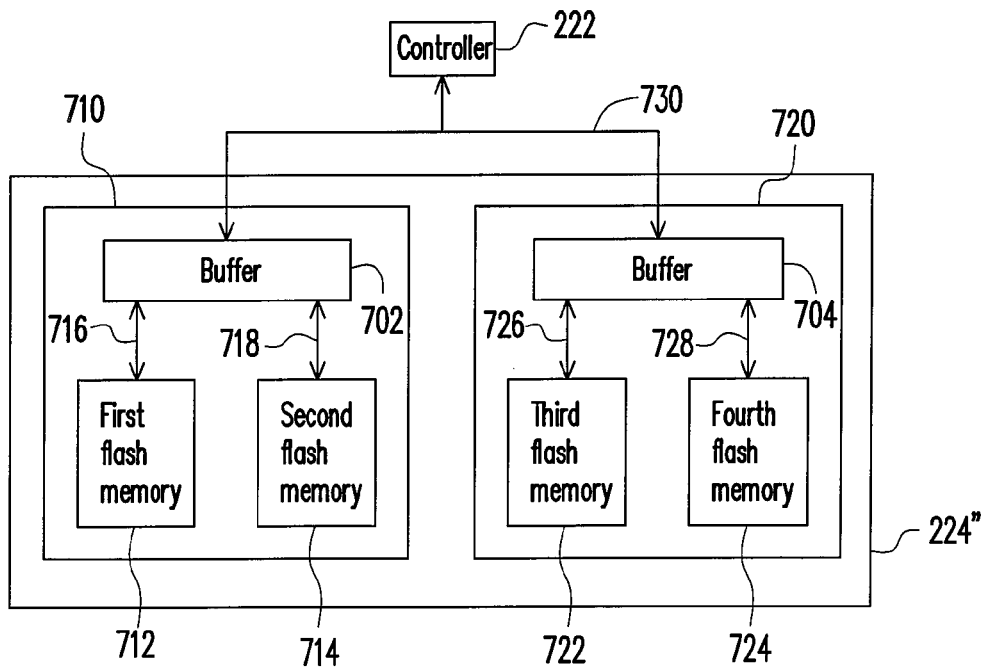
FIG. 9 is a detailed block diagram of a flash memory module according to a third embodiment of the present invention.

FIG. 9 is a detailed block diagram of a flash memory module according to the third embodiment of the present invention.

Referring to FIG. 9, the flash memory module 224" includes a first storage unit 710, a second storage unit 720, and a data bus 730.

The first storage unit 710 includes a first flash memory 712, a second flash memory 714, a first sub-bus 716, a second sub-bus 718, and a buffer 702. The second storage unit 720 includes a third flash memory 722, a fourth flash memory 724, a third sub-bus 726, a fourth sub-bus 728, and a buffer 704.

The first storage unit 710 and the second storage unit 720 are electrically connected to the data bus 730 in an interleaving way, and the data bus 730 is connected to the controller 222.

In the first storage unit 710, the first sub-bus 716 and the second sub-bus 718 electrically connect the first flash memory 712 and the second flash memory 714 to the buffer 702 in parallel, and the buffer 702 is electrically connected to the data bus 730. In the second storage unit 720, the third sub-bus 726 and the fourth sub-bus 728 electrically connect the third flash memory 722 and the fourth flash memory 724 to the buffer 704 in parallel, and the buffer 704 is electrically connected to the data bus 730.

With the structure described above, when data is written into the flash memory module 700, the first storage unit 710 and the second storage unit 720 are programmed simultaneously, and in the first storage unit 710 and the second storage unit 720, the first flash memory 712 and the second flash memory 714, and the third flash memory 722 and the fourth flash memory 724 are respectively programmed in parallel. Thus, the data writing method described above is executed in the third embodiment with four pages as a writing unit.

It should be mentioned that in the second embodiment or the third embodiment, a flash memory module having multiple SLC NAND flash memories is described as an example. However, the present invention is not limited thereto, and in another embodiment of the present invention, a flash memory module having multiple MLC NAND flash memories may also be adopted.

In the second embodiment and the third embodiment, the flash memory module is composed of two or four flash memories electronically connected to each other in an interleaving or parallel way. However, the present invention is not limited thereto, and the flash memory module may also be composed of more flash memories electrically connected in different interleaving or parallel way without departing the spirit of the present invention.

In overview, according to the data writing method provided by the present invention, data less than a writing unit is not written into a substitute block so as to reduce unnecessary block erasing operations. Accordingly, the number of erasing operations performed to the blocks is reduced and the lifespan of the flash memory is prolonged. Moreover, data less than a writing unit is accumulated to a writing unit and then written into a substitute block so that it can be avoided to execute multiple writing unit times on a data less than a writing unit and accordingly the efficiency in programming the flash memory can be improved. Furthermore, since the data writing method provided by the present invention can be applied to different flash memory structures (i.e. flash memory modules having single or multiple flash memories can be adopted, and the flash memories could be SLC NAND flash memories or MLC NAND flash memories), the convenience in managing flash memory storage devices is improved.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A data writing method for a flash memory, comprising:
   (a) receiving a first write command and dividing new data corresponding to the first write command into at least one sub-data according to a size of a writing unit;
   (b) selecting one of a plurality of spare blocks from the flash memory as a substitute block for substituting a data block, wherein the new data is to be written into the data block;
   (c) determining whether each of the at least one sub-data has the same size as the writing unit;
   (d) sequentially writing sub-data having the same size as the writing unit into the substitute block in units of the writing unit;
   (e) storing sub-data not having the same size as the writing unit into a temporary area;
   (f) receiving a second write command and determining whether an address of subsequent new data corresponding to the second write command is consecutive with an address of the new data corresponding to the first write command;
   (g) when the address of the subsequent new data corresponding to the second write command is not consecutive with the address of the new data corresponding to the first write command, writing the sub-data stored in the temporary area together with valid data in the data block into the substitute block in units of the writing unit; and
   (h) when the address of the subsequent new data is consecutive with the address of the new data, dividing the sub-data stored in the temporary area together with the subsequent new data into at least one sub-data according to the size of the writing unit and sequentially writing new sub-data having the same size as the writing unit into the substitute block in units of the writing unit,
   wherein the temporary area is configured only for storing small quantity data, wherein a size of the small quantity data is smaller than the size of the writing unit.

2. The data writing method according to claim 1, further comprising writing a valid data in the data block into the substitute block in units of the writing unit.

3. The data writing method according to claim 1, wherein when the flash memory is a multi level cell (MLC) NAND flash memory and each block in the MLC NAND flash memory comprises an upper page and a lower page at which a writing speed is faster than that at the upper pages, the data writing method further comprises using only the lower page of a block in the MLC NAND flash memory as the temporary area.

4. The data writing method according to claim 3, further comprising establishing a page lookup table for recording the physical addresses of the lower pages.

5. The data writing method according to claim 1, wherein the writing unit is one page.

6. The data writing method according to claim 1, further comprising writing the sub-data temporarily stored in the temporary area into the substitute block before a storage device comprising the flash memory is powered off.

7. The data writing method according to claim 1, wherein step (e) comprises:
combining the sub-data not having the same size as the writing unit with a portion of valid data in the data block; and
storing the sub-data combined with the portion of the valid data into the temporary area.

8. A flash memory controller, suitable for a storage device having at least one flash memory, wherein the flash memory comprises a plurality of data blocks and a plurality of spare blocks, the flash memory controller comprising:
a microprocessor unit;
a flash memory interface, electrically connected to the microprocessor unit for accessing the flash memory;
a buffer memory, electrically connected to the microprocessor unit for temporarily storing data; and
a memory management module, electrically connected to the microprocessor unit for executing data writing steps, and the data writing steps comprise:
(a) receiving a first write command and dividing new data corresponding to the first write command into at least one sub-data according to a size of a writing unit;
(b) selecting one of the spare blocks from the flash memory as a substitute block for substituting a data block, wherein the new data is to be written into the data block;
(c) determining whether each of the at least one sub-data has the same size as the writing unit;
(d) sequentially writing sub-data having the same size as the writing unit into the substitute block in units of the writing unit;
(e) storing sub-data not having the same size as the writing unit among the sub-data into a temporary area;
(f) receiving a second write command and determining whether an address of subsequent new data corresponding to the second write command is consecutive with an address of the new data corresponding to the first write command;
(g) when the address of the subsequent new data corresponding to the second write command is not consecutive with the address of the new data corresponding to the first write command, writing the sub-data stored in the temporary area together with valid data in the data block into the substitute block in units of the writing unit; and
(h) when the address of the subsequent new data is consecutive with the address of the new data, dividing the sub-data stored in the temporary area together with the subsequent new data into at least one sub-data according to the size of the writing unit and sequentially writing new sub-data having the same size as the writing unit into the substitute block in units of the writing unit,
wherein the temporary area is configured only for storing small quantity data, wherein a size of the small quantity data is smaller than the size of the writing unit.

9. The flash memory controller according to claim 8, wherein the data writing steps further comprise writing a valid data in the data block into the substitute block in units of the writing unit.

10. The flash memory controller according to claim 8, wherein the temporary area is a random access memory (RAM), a magnetoresistive random access memory (MRAM), or a phase-change random access memory (PRAM) disposed inside or outside the flash memory controller.

11. The flash memory controller according to claim 8, wherein the flash memory is a single level cell (SLC) NAND flash memory.

12. The flash memory controller according to claim 8, wherein the flash memory is a MLC NAND flash memory, each block in the MLC NAND flash memory comprises an upper page and a lower page at which a writing speed is faster than that at the upper pages, and the temporary area is the lower page of a block in the MLC NAND flash memory.

13. The flash memory controller according to claim 8, wherein the writing unit is one page.

14. The flash memory controller according to claim 10, wherein the data writing steps further comprise writing the sub-data temporarily stored in the temporary area into the substitute block before the storage device is powered off.

15. The flash memory controller according to claim 8, wherein step (e) comprises:
combining the sub-data not having the same size as the writing unit with a portion of valid data in the data block; and
storing the sub-data combined with the portion of the valid data into the temporary area.

16. A data writing method for a flash memory module, wherein the flash memory module includes a plurality of flash memories, the data writing method for the flash memory module comprising:
(a) receiving a first write command and dividing new data corresponding to the first write command into at least one sub-data according to a size of a writing unit;
(b) selecting one of a plurality of spare blocks from each of the flash memories as a substitute block for substituting a data block, wherein the new data is to be written into the data block;
(c) determining whether each of the at least one sub-data has the same size as the writing unit;
(d) sequentially writing sub-data having the same size as the writing unit into the substitute block of each of the flash memories simultaneously in units of the writing unit;
(e) storing sub-data not having the same size as the writing unit among the sub-data into a temporary area;
(f) receiving a second write command and determining whether an address of subsequent new data corresponding to the second write command is consecutive with an address of the new data corresponding to the first write command; and
(g) when the address of the subsequent new data corresponding to the second write command is not consecutive with the address of the new data corresponding to the first write command, writing the sub-data stored in the temporary area together with valid data in the data block into the substitute block in units of the writing unit; and
(h) when the address of the subsequent new data is consecutive with the address of the new data, dividing the sub-data stored in the temporary area together with the subsequent new data into at least one sub-data according to the size of the writing unit and sequentially writing new sub-data having the same size as the writing unit into the substitute block in units of the writing unit,
wherein the temporary area is configured only for storing small quantity data, wherein a size of the small quantity data is smaller than the size of the writing unit, wherein the writing unit comprises a page in each of the flash memories in the flash memory module.

17. The data writing method according to claim 16, wherein when the flash memory is a MLC NAND flash memory and each block in the MLC NAND flash memory comprises an upper page and a lower page at which a writing speed is faster than that at the upper pages, the data writing method further comprises using only the lower page of a block in the MLC NAND flash memory as the temporary area.

18. A flash memory controller, suitable for a storage device having a flash memory module, wherein the flash memory module comprises a plurality of flash memories, and each of the flash memories comprises a plurality of data blocks and a plurality of spare blocks, the flash memory controller comprising:
   a microprocessor unit;
   a flash memory interface, electrically connected to the microprocessor unit for accessing the flash memory module;
   a buffer memory, electrically connected to the microprocessor unit for temporarily storing data; and
   a memory management module, electrically connected to the microprocessor unit for executing a data writing steps, and the data writing steps comprise:
   (a) receiving a first write command and dividing new data corresponding to the first write command into at least one sub-data according to a size of a writing unit;
   (b) selecting one of the spare blocks from each of the flash memories as a substitute block for substituting a data block, wherein the new data is to be written into the data block;
   (c) determining whether each of the at least one sub-data has the same size as the writing unit;
   (d) sequentially writing the sub-data having the same size as the writing unit into the substitute block of each of the flash memories simultaneously in the writing unit;
   (e) storing sub-data not having same size as the writing unit among the sub-data into a temporary area;
   (f) receiving a second write command and determining whether an address of subsequent new data corresponding to the second write command is consecutive with an address of the new data corresponding to the first write command;
   (g) when the address of the subsequent new data corresponding to the second write command is not consecutive with the address of the new data corresponding to the first write command, writing the sub-data stored in the temporary area together with valid data in the data block into the substitute block in units of the writing unit;
   (h) when the address of the subsequent new data is consecutive with the address of the new data, dividing the sub-data stored in the temporary area together with the subsequent new data into at least one sub-data according to the size of the writing unit and sequentially writing new sub-data having the same size as the writing unit into the substitute block in units of the writing unit,
   wherein the temporary area is configured only for storing small quantity data, wherein a size of the small quantity data is smaller than the size of the writing unit,
   wherein the writing unit comprises a page in each of the flash memories in the flash memory module.

19. The flash memory controller according to claim 18, wherein the temporary area is a RAM, a MRAM, or a PRAM disposed inside or outside the flash memory controller.

20. The flash memory controller according to claim 18, wherein the flash memory is a MLC NAND flash memory, each block in the MLC NAND flash memory comprises an upper page and a lower page at which a writing speed is faster than that at the upper pages, and the temporary area is the lower page of a block in the MLC NAND flash memory.

* * * * *